United States Patent
Hori et al.

(10) Patent No.: US 10,494,484 B2
(45) Date of Patent: Dec. 3, 2019

(54) RELEASE CONTROL AGENT, SILICONE RELEASE AGENT COMPOSITION CONTAINING SAME, RELEASE SHEET, AND LAMINATED BODY

(71) Applicant: Dow Corning Toray Co., Ltd., Tokyo (JP)

(72) Inventors: Seiji Hori, Chiba (JP); Haruna Mizuno, Chiba (JP); Akihiro Nakamura, Chiba (JP); Hidefumi Tanaka, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 138 days.

(21) Appl. No.: 15/325,210

(22) PCT Filed: Jul. 9, 2015

(86) PCT No.: PCT/JP2015/003478
§ 371 (c)(1),
(2) Date: Jan. 10, 2017

(87) PCT Pub. No.: WO2016/006252
PCT Pub. Date: Jan. 14, 2016

(65) Prior Publication Data
US 2017/0190939 A1 Jul. 6, 2017

(30) Foreign Application Priority Data

Jul. 10, 2014 (JP) ................. 2014-142663

(51) Int. Cl.
| B32B 27/30 | (2006.01) |
| C08G 77/24 | (2006.01) |
| C09D 183/08 | (2006.01) |
| B32B 5/02 | (2006.01) |
| B32B 7/12 | (2006.01) |
| C09J 183/04 | (2006.01) |

(52) U.S. Cl.
CPC ............ C08G 77/24 (2013.01); B32B 5/02 (2013.01); B32B 7/12 (2013.01); B32B 27/30 (2013.01); C09D 183/08 (2013.01); B32B 2305/72 (2013.01); C09J 183/04 (2013.01); C09J 2201/606 (2013.01); C09J 2467/006 (2013.01); C09J 2483/00 (2013.01); C09J 2483/005 (2013.01)

(58) Field of Classification Search
None
See application file for complete search history.

(56) References Cited

U.S. PATENT DOCUMENTS

| 4,736,048 A | 4/1988 | Brown et al. |
| 5,356,719 A | 10/1994 | Hamada et al. |
| 5,510,407 A * | 4/1996 | Yamana .............. B29C 33/62 524/269 |
| 5,973,021 A | 10/1999 | Beck et al. |
| 2013/0101841 A1 | 4/2013 | Yang et al. |
| 2013/0178553 A1 | 7/2013 | Yang et al. |

FOREIGN PATENT DOCUMENTS

| EP | 3235874 A1 | 10/2017 |
| JP | S59219366 A | 12/1984 |
| JP | S63320 A | 1/1988 |
| JP | H06279681 A | 10/1994 |
| JP | H11156105 A | 6/1999 |
| JP | H11246772 A | 9/1999 |
| JP | 2013532223 A | 8/2013 |
| JP | 2013173944 A | 9/2013 |

OTHER PUBLICATIONS

PolyMethylTrifluoropropylsiloxane-Co-DMS_H_Kobayashi_Makromol Chem 194_ pp. 1403-1410 (1993).*
SciFinder abstract Accession No. 2009_270100 CAPLUS (2009).*
PCT/JP2015/003478 International Search Report dated Aug. 11, 2015, 2 pages.
English language abstract and machine translation for JPS59219366 (A) extracted from http://worldwide.espacenet.com database on Jan. 20, 2017, 9 pages.
English language abstract and machine translation for JPH11156105 (A) extracted from http://worldwide.espacenet.com database on Jan. 19, 2017, 17 pages.
English language abstract and machine translation for JPH11246772 (A) extracted from http://worldwide.espacenet.com database on Jan. 19, 2017, 16 pages.
English language abstract and patent for JP2013173944 (A) extracted from http://worldwide.espacenet.com database on Mar. 24, 2017, description and claims for JP2013173944 extracted from www.j-platpat.inpit.go.jp on Jan. 20, 2017, 42 pages.

* cited by examiner

*Primary Examiner* — Kenneth J Stachel
(74) *Attorney, Agent, or Firm* — Warner Norcross + Judd LLP

(57) ABSTRACT

The present invention provides a release control agent for producing a release agent composition that has sufficient releasability from a silicone-based adhesive agent and that exhibits excellent releasability even when pressure is applied to a cured product; a silicone release agent composition containing such a release control agent; a release sheet having a cured layer formed from the cured product of the silicone release agent composition; and a laminated body having the release sheet and an adhesive layer. The present invention includes a release control agent containing from 15 to 29 mol % of a fluorine atom-containing organic group in each molecule, and an organopolysiloxane having no hydrosilylation reactive group; a silicone release agent composition containing such a release control agent; a release sheet; and a laminated body.

9 Claims, No Drawings

RELEASE CONTROL AGENT, SILICONE RELEASE AGENT COMPOSITION CONTAINING SAME, RELEASE SHEET, AND LAMINATED BODY

CROSS-REFERENCE TO RELATED APPLICATIONS

This application is the National Stage of International Application No. PCT/JP2015/003478 filed on 9 Jul. 2015, which claims priority to and all advantages of Japanese Patent Application No. 2014-142663 filed on 10 Jul. 2014, the content of which is hereby incorporated by reference.

TECHNICAL FIELD

The present invention relates to a release control agent and a silicone release agent composition containing such a release control agent. Furthermore, the present invention relates to a release agent composition that is easily releasable from adhesive materials, including pressure sensitive adhesives such as silicone-based adhesive agents, even after being subjected to pressure treatment; a release sheet having a cured layer formed by curing the release agent composition; and a laminated body.

BACKGROUND ART

Release agent compositions can form films having releasability from adhesive materials, such as pressure sensitive adhesives, by applying the release agent compositions on surfaces of various substrates, such as paper, synthetic resin films, synthetic fibers, or fabric, and then curing the release agent compositions to form cured layers. As these release agent compositions, release agent compositions containing an organopolysiloxane having a fluorine atom-containing siloxane unit have been known.

For example, a silicone composition for releasing containing methylhydrogen polysiloxane capped at a terminal with a trimethylsiloxy group, methylvinylpolysiloxane capped at a terminal with a dimethylvinylsiloxy group, and a compound having a perfluoroalkyl group has been proposed (Japanese Examined Patent Application Publication No. S63-048901B). Furthermore, similarly, a coating composition containing a fluorosilicone polymer having a fluoroalkyl group and a vinyl group has been also proposed (Japanese Unexamined Patent Application Publication No. S63-000320A).

Furthermore, as a release agent composition containing a fluorosilicone polymer that does not contain any alkenyl groups, a silicone release agent composition containing an organopolysiloxane having at least one fluorine atom-containing organic group in each molecule but containing no alkenyl groups and no silicon atom-bonded hydrogen atoms has been proposed (Japanese Unexamined Patent Application Publication No. H06-279681A).

However, although these conventional release agent compositions achieve excellent releasability of cured films from organic resin-based adhesive materials, problems exist in that releasability from silicone-based adhesive agents which use an organopolysiloxane, such as dimethylpolysiloxane or methylphenylpolysiloxane, as a main component is poor. As a result, the releasability from silicone-based adhesive agents may be insufficient depending on the use thereof.

Furthermore, when a long release sheet and a laminated body are produced by applying and curing a release agent composition, typically, the long release sheet or the like is wound into a roll, and transported and stored as a wound material. At this time, it is known that winding pressure is particularly applied to the central part of the wound material; however, problems occur in that the release layer becomes difficult to be released from an adhesive material due to such application of winding pressure.

CITATION LIST

Patent Literature

Patent Document 1: Japanese Examined Patent Application Publication No. S63-048901B
Patent Document 2: Japanese Unexamined Patent Application Publication No. S63-000320A
Patent Document 3: Japanese Unexamined Patent Application Publication No. H06-279681A

SUMMARY OF INVENTION

Technical Problem

The present invention was completed to solve the problems of conventional technologies described above, and an object of the present invention is to provide a release control agent for producing a release agent composition that has sufficient releasability from a silicone-based adhesive agent and that exhibits excellent releasability even when pressure is applied to a cured product.

Another object of the present invention is to provide a silicone release agent composition containing the release control agent of the present invention, a release sheet having a cured layer formed from the cured product thereof, and a laminated body having the release sheet and an adhesive layer.

Solution to Problem

As a result of diligent research to solve the problems described above, the inventors of the present invention completed the present invention. That is, an object of the present invention can be achieved by a release control agent comprising an organopolysiloxane having from 15 to 29 mol % of a fluorine atom-containing organic group in each molecule, and having no hydrosilylation reactive group. Although the hydrosilylation reactive group is representatively exemplified by an organic group having a carbon-carbon double bond, such as an alkenyl group and an acryl group, or a silicon atom-bonded hydrogen atom, the organopolysiloxane of the present invention particularly preferably does not contain an alkenyl group as a hydrosilylation reactive group.

At least one molecular terminal group of the organopolysiloxane is preferably a trimethylsilyl group.

The fluorine atom-containing organic group is preferably a group represented by $C_nF_{2n+1}$—R—, $C_nF_{2n+1}$—R—O—R—, or $F(CF(CF_3)CF_2O)_nCF(CF_3)$—R—O—R— (in the formula, R is each independently a divalent hydrocarbon group, and n is an integer of 1 to 20).

The degree of polymerization of the organopolysiloxane is preferably from 100 to 10000.

The present invention also relates to
a silicone release agent composition containing:
(A) an organopolysiloxane having at least one fluorine atom-containing organic group and at least two alkenyl groups in each molecule;

(B) an organohydrogenpolysiloxane having at least two silicon atom-bonded hydrogen atoms in each molecule;
(C) a release control agent of the present invention; and
(D) a hydrosilylation reaction catalyst.

The content of the component (B) is preferably from 0.1 to 40 parts by mass per 100 parts by mass of the component (A).

The content of the component (C) is preferably from 0.01 to 20 parts by mass per 100 parts by mass of the component (A).

The present invention relates to a release sheet including: a cured layer consisting of a cured product formed from the silicone release agent composition described above, and a sheet-like substrate.

The sheet-like substrate is preferably paper, a plastic film, or fabric.

Furthermore, the present invention also relates to a laminated body including the release sheet and an adhesive layer.

Advantageous Effects of Invention

According to the present invention, by using a release control agent comprising an organopolysiloxane having from 15 to 29 mol % of a fluorine atom-containing organic group in each molecule, and having no hydrosilylation reactive group, a release agent composition that can form into a cured film having excellent releasability from silicone-based adhesive agents can be provided. Furthermore, the releasability is not deteriorated even when a long release sheet is wound, and releasing is easy even after pressure treatment.

Furthermore, the release control agent of the present invention can be suitably blended in a silicone release agent composition without remarkably affecting adhesive strength thereof, and can form into a film having excellent adhesion to various substrate surfaces.

DESCRIPTION OF EMBODIMENTS

The release control agent of the present invention comprises an organopolysiloxane having from 15 to 29 mol % of a fluorine atom-containing organic group in each molecule, and having no hydrosilylation reactive group.

In the present invention, the content of the fluorine atom-containing organic group is calculated as a proportion of siloxane units having a fluorine atom-containing organic group among all the siloxane units constituting the organopolysiloxane molecule.

The content of the fluorine atom-containing organic group of the organopolysiloxane described above is from 15 to 29 mol %, and preferably not less than 16, 17, 18, or 19 mol % but not greater than 28 or 27 mol %. The content of the fluorine atom-containing organic group of the organopolysiloxane is particularly preferably in a range of 19 to 27 mol %. On the other hand, when the content of the fluorine atom-containing organic group in each molecule is less than the lower limit or greater than the upper limit described above, excellent releasability may not be obtained.

In addition to the content of the fluorine atom-containing organic group, the organopolysiloxane described above is also characterized by having no hydrosilylation reactive group in each molecule. When the organopolysiloxane contains a hydrosilylation reactive group, particularly, in a silicone release agent composition that is cured by hydrosilylation reaction, the organopolysiloxane tends to form a covalent bond with a crosslinking agent or a main agent in a silicone cured product having releasability and thus excellent releasability may not be exhibited as a release control agent.

The hydrosilylation reactive group described above is a reactive functional group that may participate in an addition reaction between the carbon-carbon double bond and the silicon atom-bonded hydrogen atom in the presence of hydrosilylation reaction catalyst such as platinum-based metal catalyst, and examples thereof include organic groups having a carbon-carbon double bond as at least a part thereof, such as an alkenyl group having from 2 to 20 carbons, an acrylic group, or a methacryl group, or a silicon atom-bonded hydrogen atom. In particular, the organopolysiloxane described above preferably contains no alkenyl group or no silicon atom-bonded hydrogen atom in each molecule, and particularly preferably contains no alkenyl group. In the organopolysiloxane described above, if a hydrosilylation reactive group remains particularly at a molecular terminal, when the organopolysiloxane is used as a release control agent, releasing cannot be performed easily. In particular, when an alkenyl group, such as a vinyl group, is present at a molecular terminal of the organopolysiloxane described above, easy-release characteristics may be impaired in the case where the resulting release control agent is added to a silicone release agent composition even when the content of the fluorine atom-containing organic group is within the range described above.

The molecular terminal group of the organopolysiloxane is preferably a trimethylsiloxy group or a silanol group, and at least one molecular terminal group thereof is more preferably a trimethylsilyl group.

The fluorine atom-containing organic group is preferably a group represented by $C_nF_{2n+1}$—R—, $C_nF_{2n+1}$—R—O—R—, or $F(CF(CF_3)CF_2O)_nCF(CF_3)$—R—O—R— (in the formula, R is each independently a divalent hydrocarbon group, and n is an integer of 1 to 20).

Examples of the divalent hydrocarbon group include alkylene groups, such as a methylene group, an ethylene group, a methylmethylene group, a propylene group, and a butylene group; arylene groups, such as a phenylene group, a tolylene group, and a xylylene group; and alkylene arylene groups, such as a methylphenylene group and an ethylphenylene group.

Furthermore, the silicon atom-bonded organic group other than the fluorine atom-containing organic group is not particularly limited as long as the silicon atom-bonded organic group is a functional group that does not contain any hydrosilylation reactive groups. Specific examples of such an organic group include alkyl groups, such as a methyl group, an ethyl group, a propyl group, and a butyl group; aryl groups, such as a phenyl group, a tolyl group, and a xylyl group; and monovalent hydrocarbon groups, such as aralkyl groups including a benzyl group, and a phenethyl. Furthermore, a hydroxy group or an alkoxy group may be contained.

The molecular structure of the organopolysiloxane is not particularly limited, may be a straight, cyclic, resin-like, or partially branched straight structure, and may have partial crosslinkage. Furthermore, the viscosity is also not particularly limited, and any of liquid organopolysiloxanes having low viscosities to gum-like organopolysiloxanes having high viscosities can be used. However, from the perspective of achieving particularly excellent releasability, the viscosity at 25° C. is preferably in a range of 100 to 1000000 mPa·s, measured using a B-type viscometer in accordance with JIS K7117-1.

Furthermore, the degree of polymerization of the organopolysiloxane is preferably from 100 to 10000, more preferably from 500 to 5000, and even more preferably from 800 to 3000.

Specific examples of such an organopolysiloxane include methyl(3,3,3-trifluoropropyl)polysiloxane capped at both molecular terminals with trimethylsiloxy groups, methyl(3,3,3-trifluoropropyl)siloxane-dimethylsiloxane copolymers capped at both molecular terminals with trimethylsiloxy, methyl(perfluorobutylethyl)siloxane-dimethylsiloxane copolymers capped at both molecular terminals with trimethylsiloxy, methyl(perfluorohexylethyl)siloxane-dimethylsiloxane copolymers capped at both molecular terminals with trimethylsiloxy groups, methyl(3,3,3-trifluoropropyl)siloxane-dimethylsiloxane copolymers capped at both molecular terminals with silanol groups, methyl(perfluorobutylethyl)siloxane-dimethylsiloxane copolymers capped at both molecular terminals with silanol groups, methyl(perfluorohexylethyl)siloxane-dimethylsiloxane copolymers capped at both molecular terminals with silanol groups, and methyl(perfluorobutylethyl)siloxane-dimethylsiloxane copolymers capped at a molecular terminal with silanol and capped at another molecular terminal with a trimethylsiloxy group.

Furthermore, in the release control agent of the present invention, one type of these organopolysiloxanes can be used alone, or two or more types can be used by mixing these organopolysiloxanes.

The present invention also relates to
a silicone release agent composition including:
(A) an organopolysiloxane having at least one fluorine atom-containing organic group and at least two alkenyl groups in each molecule;
(B) an organohydrogenpolysiloxane having at least two silicon atom-bonded hydrogen atoms in each molecule;
(C) a release control agent of the present invention; and
(D) a hydrosilylation reaction catalyst.

The component (A) is a main component of the silicone release agent composition, and is an organopolysiloxane having at least one fluorine atom-containing organic group and at least two alkenyl groups in each molecule. Note that the alkenyl group is a hydrosilylation reactive group, and is a component that is different from the release control agent (component (C)) according to the present invention.

Specific examples of the fluorine atom-containing organic group of the component (A) include groups represented by $C_nF_{2n+1}$—R—, $C_nF_{2n+1}$—R—O—R—, and $F(CF(CF_3)CF_2O)_nCF(CF_3)$—R—O—R— (in the formula, R is each independently a divalent hydrocarbon group, and n is an integer of 1 to 20).

The component (A) preferably contains from 10 to 75 mol %, and more preferably contains from 10 to 50 mol %, of fluorine atom-containing organic group in each molecule.

Examples of the divalent hydrocarbon group include alkylene groups, such as a methylene group, an ethylene group, a methylmethylene group, a propylene group, and a butylene group; arylene groups, such as a phenylene group, a tolylene group, and a xylylene group; and alkylene arylene groups, such as a methylphenylene group and an ethylphenylene group.

Furthermore, the silicon atom-bonded organic group other than the fluorine atom-containing organic group and the alkenyl groups in the component (A) is not particularly limited. Specific examples of such an organic group include alkyl groups, such as a methyl group, an ethyl group, a propyl group, and a butyl group; aryl groups, such as a phenyl group, a tolyl group, and a xylyl group; and monovalent hydrocarbon groups, such as aralkyl groups including a benzyl group, and a phenethyl. The silicon atom-bonded organic group other than the fluorine atom-containing organic group and the alkenyl groups is preferably a methyl group or a phenyl group. Furthermore, the organopolysiloxane of the component (A) may contain a little amount of hydroxy groups and alkoxy groups.

The molecular structure of the component (A) described above is not particularly limited, may be a straight, cyclic, resin-like, or partially branched straight structure, and may have partial crosslinkage. Furthermore, the viscosity is also not particularly limited, and any of liquid organopolysiloxanes having low viscosities to gum-like organopolysiloxanes having high viscosities can be used. In particular, from the perspective of forming a cured film having excellent releasability, the viscosity at 25° C. of the component (A) is preferably in a range of 100 to 1000000 mPa·s, measured using a B-type viscometer in accordance with JIS K7117-1.

Specific examples of the organopolysiloxane of the component (A) include methyl(3,3,3-trifluoropropyl)polysiloxane capped at both molecular terminals with dimethylvinylsiloxy groups, (3,3,3-trifluoropropyl)siloxane-dimethylsiloxane copolymers capped at both molecular terminals with dimethylvinylsiloxy, (3,3,3-trifluoropropyl)siloxane-dimethylsiloxane-methylvinylsiloxane copolymers capped at both molecular terminals with dimethylvinylsiloxy, (3,3,3-trifluoropropyl)siloxane-methylvinylsiloxane copolymers capped at both molecular terminals with dimethylvinylsiloxy, methyl(perfluorobutylethyl)siloxane-dimethylsiloxane-methylvinylsiloxane copolymers capped at both molecular terminals with dimethylvinylsiloxy groups, methyl(perfluorohexylethyl)siloxane-dimethylsiloxane-methylvinylsiloxane copolymers capped at both molecular terminals with dimethylvinylsiloxy, (3,3,3-trifluoropropyl)siloxane-methylvinylsiloxane copolymers capped at both molecular terminals with trimethyldisiloxy, methyl(perfluorobutylethyl)siloxane-dimethylsiloxane-methylvinylsiloxane copolymers capped at both molecular terminals with trimethylsiloxy groups, methyl(perfluorohexylethyl)siloxane-dimethylsiloxane-methylvinylsiloxane copolymers capped at both molecular terminals with trimethylsiloxy groups, (perfluorobutylethyl)siloxane-dimethylsiloxane-methylhexenylsiloxane copolymers capped at both molecular terminals with dimethylvinylsiloxy groups, methyl(3,3,3-trifluoropropyl)siloxane-methylvinylsiloxane copolymers capped at both molecular terminals with silanol, methyl(3,3,3-trifluoropropyl)siloxane-dimethylsiloxane-methylvinylsiloxane copolymers capped at both molecular terminals with silanol, methyl(perfluorobutylethyl)siloxane-dimethylsiloxane-methylvinylsiloxane copolymers capped at both molecular terminals with silanol, methyl(perfluorohexylethyl)siloxane-dimethylsiloxane-methylvinylsiloxane copolymers capped at both molecular terminals with silanol, and methyl(perfluorobutylethyl)siloxane-dimethylsiloxane-methylvinylsiloxane copolymers capped at a molecular terminal with a silanol group and capped at another molecular terminal with a trimethylsiloxy group.

The component (B) serves as a crosslinking agent in the composition of the present invention and is an organohydrogenpolysiloxane having at least two silicon atom-bonded hydrogen atoms in each molecule. Note that the silicon atom-bonded hydrogen atom is a hydrosilylation reactive group, and is a component that is different from the release control agent (component (C)) according to the present invention.

The silicon atom-bonded organic group other than the silicon atom-bonded hydrogen atom in the component (B) is not particularly limited. Specific examples thereof include alkyl groups, such as a methyl group, an ethyl group, a propyl group, a butyl group, and a benzyl group; aryl groups, such as a phenyl group, a tolyl group, and a xylyl group; and monovalent hydrocarbon groups, such as aralkyl groups including a benzyl group, and a phenethyl.

Furthermore, the organohydrogenpolysiloxane of the component (B) may have a fluorine atom-containing organic group. Specific examples of the fluorine atom-containing organic group include groups represented by $C_nF_{2n+1}$—R—, $C_nF_{2n+1}$—R—O—R—, and $F(CF(CF_3)CF_2O)_nCF(CF_3)$—R—O—R— (in the formula, R is each independently a divalent hydrocarbon group, and n is an integer of 1 to 20).

Examples of the divalent hydrocarbon group include alkylene groups, such as a methylene group, an ethylene group, a methylmethylene group, a propylene group, and a butylene group; arylene groups, such as a phenylene group, a tolylene group, and a xylylene group; and alkylene arylene groups, such as a methylphenylene group and an ethylphenylene group.

The molecular structure of the component (B) described above is not particularly limited, may be a straight, cyclic, resin-like, or partially branched straight structure, and may have partial crosslinkage. Furthermore, the viscosity is also not particularly limited and, from the perspective of ease in handling and suitable effect as a crosslinking agent, the viscosity at 25° C. is preferably in a range of 1 to 100000 mPa·s, measured using a B-type viscometer in accordance with JIS K7117-1.

Specific examples of the organohydrogenpolysiloxane of the component (B) described above include methylhydrogenpolysiloxane capped at both molecular terminals with trimethyl, methylhydrogensiloxane-methyl(3,3,3-trifluoropropyl)siloxane copolymers capped at both molecular terminals with trimethylsiloxy, dimethylsiloxane-methylhydrogensiloxane copolymers capped at both molecular terminals with trimethylsiloxy, methyl(perfluorobutylethyl)siloxane-methylhydrogensiloxane copolymers capped at both molecular terminals with dimethylhydrogensiloxy, methyl(perfluorobutylethyl)siloxane-dimethylsiloxane-methylhydrogensiloxane copolymers capped at both molecular terminals with trimethylsiloxy groups, methyl(perfluorohexylethyl)siloxane-methylhydrogenpolysiloxane copolymers capped at both molecular terminals with trimethylsiloxy groups, and copolymers formed from methyl(perfluorobutylethyl)siloxane units, dimethylhydrogensiloxane units and $SiO_{4/2}$ units.

In the silicone release agent composition of the present invention, the content of the component (B) is from 0.1 to 40 parts by mass, and preferably from 0.1 to 20 parts by mass, per 100 parts by mass of the component (A). This is because, when the content of the component (B) is less than 0.1 parts by mass per 100 parts by mass of the component (A), the rate of formation of the cured film of the resulting silicone release agent composition becomes significantly slow, and when the content is greater than 40 parts by mass, easy-releasability of the resulting cured film from adhesive materials may not be achieved.

The component (C) is a release control agent of the present invention and is a component that imparts excellent releasability to the resulting film obtained by curing the silicone release agent composition. The content and the preferred range of the fluorine atom-containing organic group in the component (C) are as described above. The content of the component (C) is in a range of 0.01 to 20 parts by mass, and preferably in a range of 1 to 15 parts by mass, per 100 parts by mass of the component (A). When the content of the component (C) is less than 0.01 parts by mass per 100 parts by mass of the component (A), easy-releasability from adhesive materials exhibited by the film (releasable cured film) that is obtained by curing may be significantly deteriorated. Furthermore, when the content of the component (C) is greater than 20 parts by mass, strength of the film obtained by curing is significantly reduced, and the component (C) tends to ooze out of the cured film, thereby significantly reducing residual adhesion ratio described below.

The component (D) is a hydrosilylation reaction catalyst that functions as a catalyst to crosslink the organopolysiloxane of the component (A) and the organohydrogenpolysiloxane of the component (B).

The hydrosilylation reaction catalyst of the component (D) is not particularly limited, and specific examples thereof include microparticulate platinum adsorbed on a silica fine powder or carbon powder support, chloroplatinic acid, alcohol-modified chloroplatinic acid, olefin complex of chloroplatinic acid, and coordinate compounds of chloroplatinic acid and vinylsiloxane, platinum black, palladium, and rhodium catalysts.

Furthermore, in the silicone release agent composition of the present invention, the content of the component (D) is a catalytic quantity, and when a platinum-based catalyst is used as the component (D), the platinum metal content contained in the platinum-based catalyst is, in terms of mass unit, practically preferably an amount in a range of 0.01 to 1000 ppm, and particularly preferably in a range of 0.1 to 500 ppm, in the silicone release agent composition.

The silicone release agent composition of the present invention contains the component (A) to the component (D) described above and can be prepared by uniformly mixing these. The method of preparing the silicone release agent composition of the present invention is not particularly limited, and examples thereof include a method in which the component (A) and the component (B) are uniformly mixed and then a mixture of the component (C) and the component (D) is blended thereto, and a method in which the component (A), the component (B), and the component (C) are uniformly mixed and then the component (D) is blended thereto.

Furthermore, in the silicone release agent composition of the present invention, an organic solvent can be used as necessary as a component other than the component (A) to the component (D) described above. When any of the component (A) to the component (C) has high viscosity, the component(s) can be mixed uniformly into the organic solvent. Furthermore, the coatability of the resulting silicone release agent composition of the present invention to various substrates can be enhanced.

The type of the organic solvent that can be blended to the silicone release agent composition of the present invention is not particularly limited as long as the organic solvent can uniformly dissolve the component (A) to the component (C). Specific examples of such an organic solvent include aromatic hydrocarbon-based organic solvents, such as trifluorotoluene and hexafluoroxylene; aliphatic hydrocarbon-based organic solvents, such as heptane, hexane, pentane, and isooctane; halogenated hydrocarbon-based organic solvents, such as trichloroethylene and perchloroethylene; ketone-based organic solvents, such as acetone and methyl ethyl ketone; ether-based solvents, such as diethyl ether and methylbutyl ether; and ester-based organic solvents, such as methyl acetate and ethyl acetate.

Furthermore, the silicone release agent composition of the present invention preferably contains a little amount of a hydrosilylation reaction inhibitor exemplified by an alkynyl alcohol, such as 3-methyl-1-butyn-3-ol, 3,5-dimethyl-1-hexyn-3-ol, 3-methyl-1-penten-3-ol, or phenylbutynol; 3-methyl-3-penten-1-yne, 3,5-dimethyl-1-hexyn-3-yne, a (tetramethylvinylsiloxane) cyclic material, or benzotriazole as an optional component to suppress catalytic activity of the component (D) and to enhance storage stability of the composition at room temperature.

The silicone release agent composition of the present invention contains the component (A) to the component (D) described above and may contain an optional organic solvent and/or hydrosilylation reaction inhibitor. To obtain excellent coating characteristics to a substrate, the viscosity at 25° C. of the silicone release agent composition of the present invention is preferably in a range of 100 to 100000 mPa·s, measured using a B-type viscometer in accordance with JIS K7117-1.

Optional components other than the components described above can be added to the curable organopolysiloxane composition according to the present invention. For example, publicly known additives including adhesion promoters formed from an alkoxysilane compound such as 3-glycidoxypropyltrimethoxysilane and 3-methacryloxypropyltrimethoxysilane; phenol-based, quinone-based, amine-based, phosphorous-based, phosphite-based, sulfur-based, and thioether-based antioxidants and the like; triazole-based and benzophenone-based photostabilizers and the like; phosphate ester-based, halogen-based, phosphorous-based, and antimony-based flame retardants and the like; one or more types of surfactants formed from a cationic surfactant, an anionic surfactant, a nonionic surfactant, or the like; anti-static agents; heat resistant agents; dyes; pigments; and the like can be added.

The silicone release agent composition of the present invention can form a film that has excellent releasability from adhesive materials such as pressure sensitive adhesives exemplified by silicone-based adhesive agents or the like, and that has excellent adhesion to surfaces of various sheet-like substrates, such as paper, plastic films or fabric, by applying the silicone release agent composition onto a surface of various sheet-like substrate, such as paper, a plastic film, or fabric, and then curing, for example, in a condition at room temperature or heating temperature of 50 to 200° C. for heating time of 20 to 300 seconds. By such a method, a cured layer formed from a cured product of the silicone release agent composition of the present invention and a release sheet having a sheet-like substrate can be produced.

Examples of the sheet-like substrate include papers, such as Washi (Japanese paper), paperboard, cardboard, clay-coated paper, polyolefin laminated paper, especially polyethylene laminated paper, and synthetic paper; plastic films, such as polyimide, polyethylene, polypropylene, polystyrene, polyvinylchloride, polycarbonate, polyethylene terephthalate, and nylon; fabric, such as natural fiber fabric, synthetic fiber fabric, and artificial leather fabric; glass wool, and metal foil.

To enhance adhesion between the silicone release agent composition of the present invention and the surface of the sheet-like substrate, one face or both faces of the sheet-like substrate can be subjected to surface treatment, such as an oxidation method or embossing method, or primer treatment. Examples of the oxidation method include corona discharge treatment, plasma discharge treatment, chromium oxidation treatment (wet method), flame treatment, hot air treatment, ozone treatment, and ultraviolet irradiation treatment. Examples of the embossing method include sandblast-ing method, and thermal spraying method. The surface treatment methods can be selected appropriately depending on the type of the sheet-like substrate. Furthermore, when the silicone release agent composition of the present invention is used as a release film for use in a material for forming a dielectric ceramic layer, especially as a release film for forming a ceramic green sheet, use of a sheet-like substrate that is formed by subjecting the sheet-like substrate (film) to antistatic treatment is effective to prevent occurrence of coating failure of the ceramic slurry to the sheet-like substrate, or the like.

The thickness of the sheet-like substrate is typically from 10 to 300 μm, preferably from 15 to 200 μm, and particularly preferably from 20 to 125 μm.

Although any publicly known method can be used as the method of applying the silicone release agent composition of the present invention to the sheet-like substrate, examples thereof include a gravure coating method, bar coating method, spray coating method, spin coating method, knife coating method, roll coating method, die coating method, and the like.

When the silicone release agent composition of the present invention is applied and cured on the sheet-like substrate, the thickness of the cured layer of the silicone release agent composition is not particularly limited; however, the thickness is preferably from 0.01 to 10 μm, and more preferably from 0.01 to 5 μm.

Furthermore, to the release sheet on which the silicone release agent composition is applied and cured, an adhesive material, such as silicone-based adhesive agent, may be applied on another face that is located opposite to the face where the silicone release agent composition was applied, to form a laminated body with an adhesive layer.

The adhesive material applied to the laminated body described above are various types of adhesive agents and various types of bonding agents. Examples thereof include the acrylic resin-based adhesive agents, rubber-based adhesive agents, silicone-based adhesive agents, acrylic resin-based adhesive agents, synthetic rubber-based adhesive agents, silicone-based adhesive agents, epoxy resin-based adhesive agents, and polyurethane-based adhesive agents. Other examples include asphalt, soft rice-cake-like sticky foods, glue, and birdlime. A silicone-based adhesive agent is particularly preferable.

In particular, the cured layer formed from the silicone release agent composition of the present invention can be used as a releasable layer of a laminated body, including a laminated body having an adhesive layer such as casting paper, adhesive material packaging paper, adhesive tape, adhesive labels, protective sheets, releasable adhesive sheets, and release films for forming dielectric ceramic layers (e.g. release films for forming ceramic green sheets), since the cured layer exhibits excellent easy-release characteristics from other adhesive layers. Specifically, by using the silicone release agent composition of the present invention, a laminated body can be obtained that is formed by adhering an adhesive sheet having an adhesive agent layer (or adhesive layer) on at least one face of a sheet-like substrate to a sheet-like substrate having a cured layer (releasable layer or release layer), formed by heat curing the silicone release agent composition of the present invention on at least one face thereof, so that the adhesive agent layer is in contact with the cured layer. In addition to the antistatic layer described above, any layer can be formed optionally on the surface of the sheet-like substrate located opposite to the cured layer formed from the silicone release agent composition of the present invention or in between the sheet-like substrate and the cured layer formed from the silicone release agent composition of the present invention.

A protective sheet or releasable adhesive sheet provided with the cured layer formed from the composition of the present invention can be used in applications in which the protective sheet or releasable adhesive sheet is adhered to the surface of an article to protect the article when transporting, processing, or curing. Examples of the article include metal plates, coated metal plates, aluminum window sashes, resin plates, decorative steel plates, vinyl chloride-steel plate laminated bodies, and glass plates. Additionally, the protective sheet or releasable adhesive sheet can be suitably used as a protective sheet for use in the manufacturing process of various types of liquid crystal display panels (also called monitors or displays), the distribution process of polarizing plates, the manufacturing process and distribution process of various types of mechanical resin members for use in vehicles and the like, food packaging, and the like. For example, the sheet-like article having the cured layer formed from the composition of the present invention can be used as a surface protective film for protecting the surface of a liquid crystal panel, a plasma display, a polarizing plate, a retardation plate or similar optical part, a printed circuit board, an IC, a transistor, a capacitor, or other electronic/electric part. In such a case, it is preferable that a publicly known anti-static agent be added to the composition of the present invention.

Similarly, the sheet-like article having the cured layer formed by applying and curing the silicone release agent composition of the present invention on a sheet-like substrate can be used as a release film for forming a dielectric ceramic layer, especially a release film for forming a ceramic green sheet. The ceramic green sheet can be formed by a method including a step of applying a ceramic slurry on the release film for forming a ceramic green sheet of the present invention, that is, on a face where the cured polyorganosiloxane composition is located, and a step of drying the slurry.

EXAMPLES

The present invention is described in detail below based on examples, but the present invention is not limited to the examples. Note that, in the examples, "part" indicates "part by mass", Me represents a methyl group, Vi represents a vinyl group, and $C_4F_9H_4$ represents a $CH_2CH_2C_4F_9$ group. Furthermore, each of the structures of the fluorosilicones shown in synthesis examples was identified using $^{29}$Si- and $^{13}$C-NMR (JNM-ECA500, manufactured by JEOL Ltd.).

Fluorosilicones that were used in the release agent compositions of the examples and the comparative examples were synthesized according to the methods described below.

Synthesis Example 1: Synthesis of Fluorosilicone 1

In a reaction vessel, 57.74 parts of $(MeC_6F_9H_4SiO)_3$, 42.03 parts of $(Me_2SiO)_4$, 0.24 parts of $(Me_3SiO_{1/2})_2$, and 0.017 parts of trifluoromethanesulfonic acid were charged, agitated and mixed, and polymerized at 60° C. for 6 hours. After the polymerization, the mixture was cooled to 40° C., and 5.6 parts of sodium hydrogencarbonate was added to neutralize the mixture, and agitation was continued for 1 hour. Thereafter, the agitation was stopped, and the reaction product was cooled to room temperature by leaving the reaction product overnight. By filtering the cooled reaction product, a neutralized salt of trifluoromethanesulfonic acid and sodium hydrogencarbonate was removed, and stripping was performed in an $N_2$ stream at 160° C. under full vacuum for 2 hours. As a result, fluorosilicone having the following average molecular formula was obtained.

$(Me_3SiO_{1/2})_{0.86}(HOMe_2SiO_{1/2})_{1.14}(MeC_6F_9H_4SiO)_{374}(Me_2SiO)_{1053}$

Synthesis Example 2: Synthesis of Fluorosilicone 2

In a reaction vessel, 50.69 parts of $(MeC_6F_9H_4SiO)_3$, 49.20 parts of $(Me_2SiO)_4$, 0.11 parts of $(Me_3SiO_{1/2})_2$, and 0.017 parts of trifluoromethanesulfonic acid were charged, agitated and mixed, and polymerized at 60° C. for 6 hours. After the polymerization, the mixture was cooled to 40° C., and 5.6 parts of sodium hydrogencarbonate was added to neutralize the mixture, and agitation was continued for 1 hour. Thereafter, the agitation was stopped, and the reaction product was cooled to room temperature by leaving the reaction product overnight. By filtering the cooled reaction product, a neutralized salt of trifluoromethanesulfonic acid and sodium hydrogencarbonate was removed, and stripping was performed in an $N_2$ stream at 160° C. under full vacuum for 2 hours. As a result, fluorosilicone having the following average molecular formula was obtained.

$(Me_3SiO_{1/2})_{1.25}(HOMe_2SiO_{1/2})_{0.75}(MeC_6F_9H_4SiO)_{256}(Me_2SiO)_{992}$

Synthesis Example 3: Synthesis of Fluorosilicone 3

In a reaction vessel, 63.79 parts of $(MeC_6F_9H_4SiO)_3$, 36.11 parts of $(Me_2SiO)_4$, 0.09 parts of $(Me_3SiO_{1/2})_2$, and 0.017 parts of trifluoromethanesulfonic acid were charged, agitated and mixed, and polymerized at 60° C. for 6 hours. After the polymerization, the mixture was cooled to 40° C., and 5.6 parts of sodium hydrogencarbonate was added to neutralize the mixture, and agitation was continued for 1 hour. Thereafter, the agitation was stopped, and the reaction product was cooled to room temperature by leaving the reaction product overnight. By filtering the cooled reaction product, a neutralized salt of trifluoromethanesulfonic acid and sodium hydrogencarbonate was removed, and stripping was performed in an $N_2$ stream at 160° C. under full vacuum for 2 hours. As a result, fluorosilicone having the following average molecular formula was obtained.

$(Me_3SiO_{1/2})_{1.27}(HOMe_2SiO_{1/2})_{0.73}(MeC_6F_9H_4SiO)_{619}(Me_2SiO)_{1379}$

Synthesis Example 4: Synthesis of Fluorosilicone 4

In a reaction vessel, 37.01 parts of $(MeC_6F_9H_4SiO)_3$, 62.86 parts of $(Me_2SiO)_4$, 0.13 parts of $(Me_3SiO_{1/2})_2$, and 0.017 parts of trifluoromethanesulfonic acid were charged, agitated and mixed, and polymerized at 60° C. for 6 hours. After the polymerization, the mixture was cooled to 40° C., and 5.6 parts of sodium hydrogencarbonate was added to neutralize the mixture, and agitation was continued for 1 hour. Thereafter, the agitation was stopped, and the reaction product was cooled to room temperature by leaving the reaction product overnight. By filtering the cooled reaction product, a neutralized salt of trifluoromethanesulfonic acid and sodium hydrogencarbonate was removed, and stripping was performed in an $N_2$ stream at 160° C. under full vacuum for 2 hours. As a result, fluorosilicone having the following average molecular formula was obtained.

$(Me_3SiO_{1/2})_{1.08}(HOMe_2SiO_{1/2})_{0.92}(MeC_6F_9H_4SiO)_{210}(Me_2SiO)_{1326}$

Synthesis Example 5: Synthesis of Fluorosilicone 5

In a reaction vessel, 57.74 parts of $(MeC_6F_9H_4SiO)_3$, 42.03 parts of $(Me_2SiO)_4$, 0.24 parts of $(ViMe_2SiO_{1/2})_2$, and 0.0017 parts of trifluoromethanesulfonic acid were charged, agitated and mixed, and polymerized at 60° C. for 6 hours. After the polymerization, the mixture was cooled to 40° C., and 5.6 parts of sodium hydrogencarbonate was added to neutralize the mixture, and agitation was continued for 1 hour. Thereafter, the agitation was stopped, and the reaction product was cooled to room temperature by leaving the reaction product overnight. By filtering the cooled reaction product, a neutralized salt of trifluoromethanesulfonic acid and sodium hydrogencarbonate was removed, and stripping was performed in an $N_2$ stream at 160° C. under full vacuum for 2 hours. As a result, fluorosilicone having the following average molecular formula was obtained.

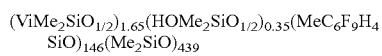

$(ViMe_2SiO_{1/2})_{1.65}(HOMe_2SiO_{1/2})_{0.35}(MeC_6F_9H_4SiO)_{146}(Me_2SiO)_{439}$

Preparations of the silicone adhesive agents of the examples and the comparative examples were performed according to the methods described below.

Preparation of Silicone Adhesive Agent

By adding 50 parts of toluene, 100 parts of SD4580FC, an addition curable silicone adhesive agent, manufactured by Dow Corning Toray Co., Ltd. was diluted, and 1 part of BY24-741 Crosslinker manufactured by Dow Corning Toray Co., Ltd. as a crosslinking agent and 0.9 parts of NC-25 Catalyst manufactured by Dow Corning Toray Co., Ltd. as a platinum catalyst were added thereto and sufficiently agitated.

The peel force and residual adhesion ratio in the examples and the comparative examples were measured according to the method described below, and the results are shown in Table 1 together with the contents of the fluorine atom-containing organic groups of the release control agents.

Measurement of Peel Force

The silicone release agent composition was applied in a manner that the coated amount of the silicone release agent composition applied on a substrate surface of a polyethylene terephthalate resin film was approximately 1 g/m² using a Mayer bar #10 and heated in a circulating hot air oven at 150° C. for 40 seconds to produce a release sheet.

Thereafter, on this release sheet, an adhesive layer was formed according to any of the following conditions 1 to 3, to produce a laminated body by adhering the adhesive layer to the polyethylene terephthalate resin film. A test piece was produced by cutting this laminated body into a width of 2.5 cm. The force required to peel [gf/in] was measured by peeling off the film, on which the silicone release agent composition was applied, at an angle of 180° and a peeling rate of 0.3 m/min using an adhesion release tester.

Production Condition 1 of Laminated Body Sample

The release sheet obtained by heating in a circulating hot air oven at 150° C. for 40 seconds was left as is at room temperature for 1 day after the release sheet was removed from the oven. An adhesive agent was then applied on the face where the release agent was applied in a manner that the coating thickness of the adhesive agent after the adhesive agent was cured was 100 μm. After being left at room temperature for 150 seconds, this sheet was cured in an oven at 180° C. for 150 seconds. The obtained adhesive sheet was removed from the oven, adhered to a polyethylene terephthalate resin film using a hand roller with 2 kgf, and aged under a load of 20 g/cm² at room temperature for 30 minutes.

Production Condition 2 of Laminated Body Sample

After the release sheet obtained by heating in a circulating hot air oven at 150° C. for 40 seconds was removed from the oven, an adhesive agent was applied on a face, where the release agent was applied, in a manner that the coating thickness of the adhesive agent after the adhesive agent was cured was 100 μm. After being left at room temperature for 150 seconds, this sheet was cured in an oven at 180° C. for 150 seconds. The obtained adhesive sheet was removed from the oven, adhered to a polyethylene terephthalate resin film using a hand roller with 2 kgf, and aged under a load of 100 kg/cm² at room temperature for 1 day.

Production Condition 3 of Laminated Body Sample

After the release sheet obtained by heating in a circulating hot air oven at 150° C. for 40 seconds was removed from the oven, the release sheet was overlaid on a polyethylene terephthalate resin film using a hand roller, and aged under a load of 100 kg/cm² at room temperature for 1 day. Thereafter, the polyethylene terephthalate resin film was peeled off, and an adhesive agent was then applied on the face, where the release agent was applied, of the release sheet in a manner that the coating thickness of the adhesive agent after the adhesive agent was cured was 100 μm. After being left at room temperature for 150 seconds, this sheet was cured in an oven at 180° C. for 150 seconds. The obtained adhesive sheet was removed from the oven, adhered to another polyethylene terephthalate resin film using a hand roller with 2 kgf, and aged under a load of 20 g/cm² at room temperature for 30 minutes.

Residual Adhesion Ratio

A test piece was produced according to the production condition 1 of laminated body sample for evaluation described above and was subjected to release resistance measurement, and then the test piece was adhered to a mirror face stainless steel plate using a 2 kg hand roller and left at room temperature for 30 minutes. Thereafter, the force required to peel (F1) [gf/in] was measured by peeling off the test piece at an angle of 180° and a peeling rate of 0.3 m/min.

Thereafter, separately from the sample described above, an adhesive agent was applied on another polyethylene terephthalate resin film in a manner that the coating thickness of the adhesive agent after the adhesive agent was cured was 100 μm. After the coated article was left at room temperature for 150 seconds, this sheet was cured in an oven at 180° C. for 150 seconds. Then, after the cured product was left at room temperature for 1 day, a test piece was produced by cutting the cured product into a width of 2.5 cm. This test piece was adhered to a mirror face stainless steel plate using a 2 kg hand roller and left at room temperature for 30 minutes. Thereafter, the force required to peel (F2) [gf/in] was measured by peeling off the test piece at an angle of 180° and a peeling rate of 0.3 m/min. The residual adhesion ratio was determined by $((F1)/(F2)) \times 100$ [%].

Example 1: Preparation of Silicone Release Agent Composition

By adding 88.24 parts of isooctane, 11.76 parts of Q2-7785 Release Coating, a release agent for addition curable silicone adhesive agent, manufactured by Dow Corning Corporation (a mixture of organopolysiloxane having a fluorine atom-containing organic group and two or more alkenyl groups, a very small amount of platinum catalyst, and a solvent; solid content: 85%), was diluted, and 0.4 parts of 7560 Crosslinker manufactured by Dow Corning Corporation (a methyl(perfluorobutylethyl)-methylhydrogensiloxane copolymer having a trimethylsiloxy terminal), as a crosslinking agent, was further added thereto. As a release control agent, a substance obtained by diluting the fluorosilicone 1 obtained in Synthesis Example 1 with isooctane in a manner that the solid content thereof was 10% was prepared. Thereafter, the release control agent was added and mixed to the mixture in a manner that the amount of the fluorosilicone 1 was 0.5 parts per 11.76 parts of Q2-7785 Release Coating, to prepare the silicone release agent composition.

Example 2

A silicone release agent composition was prepared by the same method as that of Example 1 except for adding the fluorosilicone 2 obtained in Synthesis Example 2 in place of the fluorosilicone 1 in the release control agent.

Example 3

A silicone release agent composition was prepared by the same method as that of Example 1 except for adding the fluorosilicone 1 obtained in Synthesis Example 1 in a manner that the amount of the fluorosilicone 1 was 2.0 parts per 11.76 parts of Q2-7785 Release Coating in the release control agent.

Comparative Example 1

A silicone release agent composition was prepared by the same method as that of Example 1 except for adding the fluorosilicone 3 obtained in Synthesis Example 3 in place of the fluorosilicone 1 in the release control agent.

Comparative Example 2

A silicone release agent composition was prepared by the same method as that of Example 1 except for adding the fluorosilicone 4 obtained in Synthesis Example 4 in place of the fluorosilicone 1 in the release control agent.

Comparative Example 3

A silicone release agent composition was prepared by the same method as that of Example 1 except for adding the fluorosilicone 5 obtained in Synthesis Example 5 (vinyl group content: 0.04 mass %) in place of the fluorosilicone 1 in the release control agent.

Comparative Example 4

A silicone release agent composition was prepared by the same method as that of Example 1 except for adding fluorosilicone 6 represented by the following average molecular formula:

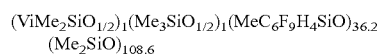

(vinyl group content: 0.14 mass %) in place of the fluorosilicone 1 in the release control agent.

Comparative Example 5

A silicone release agent composition was prepared by the same method as that of Example 1 except that any components that correspond to the release control agent were not added.

Table 1: Peel Force and Residual Adhesion Ratio with Regard to Adhesive Agent

TABLE 1

|  |  | Examples | | | Comparative examples | | | | |
| --- | --- | --- | --- | --- | --- | --- | --- | --- | --- |
|  |  | 1 | 2 | 3 | 1 | 2 | 3 | 4 | 5 |
| F mol % of release control agent (*1) | | 26.2 | 20.5 | 26.2 | 31.0 | 13.7 | 24.9 | 25.0 | — |
| Number of parts of added release control agent (*2) | | 0.5 | 0.5 | 2.0 | 0.5 | 0.5 | 0.5 | 0.5 | — |
| Presence/absence of hydrosilylation reactive group in release control agent | | Absent | Absent | Absent | Absent | Absent | Present | Present | — |
| Vinyl group content in release control agent: mass % | | — | — | — | — | — | 0.04 | 0.14 | — |
| Peel force [gf/in] | Sample production condition 1 | 13 | 9 | 9 | 68 | 270 | 405 | 150 | 250 |
|  | Sample production condition 2 | 166 | 220 | 150 | 370 | 620 | 470 | 170 | >1000 |
|  | Sample production condition 3 | 7 | 11 | 35 | 168 | 420 | 280 | 420 | 290 |
| Residual adhesion ratio [%] | | 76 | 71 | 69 | 91 | 100 | 96 | 90 | 100 |

(*1) indicates the proportion of siloxane unit having a fluorine atom-containing organic group (mol %) among all the siloxane units in the organopolysiloxane which was the release control agent.
(*2) indicates number of parts of added release control agent per 11.76 parts of Q2-7785 Release Coating. Since the solid content concentration of the Q2-7785 is 85%, the added amounts shown in the table (0.5 parts and 2.0 parts) respectively correspond to 5.0 parts and 20.0 parts when the solid content concentration is converted to the solid content of 100 parts by mass.

As is clear from the results shown in Table 1, the cases where the content of the fluorine atom-containing organic group of the organopolysiloxane, which was the release control agent, was in the range of 15 to 29 mol % and no alkenyl group and no silicon atom-bonded hydrogen atom were contained (Example 1 to Example 3) achieved easy releasing in all of the conditions 1 to 3 compared to the cases where the content of the fluorine atom-containing organic group of the organopolysiloxane was not within the range described above (Comparative Example 1 and Comparative Example 2).

Meanwhile, the cases where the organopolysiloxane had a reactive alkenyl group in each molecule (Comparative Example 3 and Comparative Example 4) could not achieve easy releasing even though the content of the fluorine atom-containing organic group was in the range of 15 to 29 mol %. Note that Comparative Example 5 was a control experiment which used no release control agent, and it was confirmed that the release control agents according to the present invention (Example 1 to Example 3) significantly reduced the peel force required to peel off from the adhesive agent in all cases where the sample production conditions 1 to 3 were used.

INDUSTRIAL APPLICABILITY

The release control agent of the present invention can be suitably used in a silicone release agent composition, a release sheet having a cured layer formed from the cured product thereof, and a laminated body having the release sheet and an adhesive layer. Furthermore, because of excellent characteristics thereof, it is possible to form a cured film having excellent releasability even after the cured film was subjected to pressure treatment using a silicone-based adhesive agent.

The invention claimed is:

1. A silicone release agent composition comprising:
   (A) an organopolysiloxane having at least one fluorine atom-containing organic group and at least two alkenyl groups in each molecule;
   (B) an organohydrogenpolysiloxane having at least two silicon atom-bonded hydrogen atoms in each molecule;
   (C) a release control agent comprising an organopolysiloxane having from 20.5 to 26.2 mol % of a fluorine atom-containing organic group in each molecule, and having no hydrosilylation reactive group, wherein the content of the fluorine atom-containing organic group is calculated as a proportion of siloxane units having a fluorine atom-containing organic group among all the siloxane units constituting each organopolysiloxane molecule; and
   (D) a hydrosilylation reaction catalyst.

2. The silicone release agent composition according to claim 1, wherein a content of the organohydrogenpolysiloxane (B) is from 0.1 to 40 parts by mass per 100 parts by mass of the organopolysiloxane (A).

3. The silicone release agent composition according to claim 1, wherein a content of the release control agent (C) is from 0.01 to 20 parts by mass per 100 parts by mass of the organopolysiloxane (A).

4. The silicone release agent composition according to claim 1, wherein at least one molecular terminal group of the organopolysiloxane of component (C) is a trimethylsilyl group.

5. The silicone release agent composition according to claim 1, wherein the fluorine atom-containing organic group of component (C) is a group represented by $C_nF_{2+1}$—R—, $C_nF2_{n+1}$-R—O—R—, or $F(CF(CF_3)CF_2O)_nCF(CF_3)$—R—O—R—, wherein R is each independently a divalent hydrocarbon group, and n is an integer of 1 to 20.

6. The silicone release agent composition according to claim 1, wherein a degree of polymerization of the organopolysiloxane of component (C) is from 100 to 10,000.

7. A release sheet comprising:
   a cured layer consisting of a cured product formed from the silicone release agent composition according to claim 1; and
   a sheet-like substrate.

8. The release sheet according to claim 7, wherein the sheet-like substrate is paper, a plastic film, or fabric.

9. A laminated body comprising:
   the release sheet according to claim 7; and
   an adhesive layer.

* * * * *